(12) United States Patent
Takahashi et al.

(10) Patent No.: US 6,695,279 B2
(45) Date of Patent: Feb. 24, 2004

(54) PRESSURE-RESPONSIVE ACTUATOR (75) Inventors: Kenji Takahashi, Shinjuku-ku (JP); Kenji Kudo, Shinjuku-ku (JP)

(73) Assignee: Keihin Corporation, Tokyo (JP)

( * ) Notice: Subject to any disclaimer, the term of this patent is extended or adjusted under 35 U.S.C. 154(b) by 95 days.

(21) Appl. No.: 10/172,309

(22) Filed: Jun. 14, 2002

(65) Prior Publication Data

US 2003/0015089 A1 Jan. 23, 2003

(30) Foreign Application Priority Data

Jun. 22, 2001 (JP) ........................... 2001-189214
Jun. 22, 2001 (JP) ........................... 2001-189215
Jul. 3, 2001 (JP) ........................... 2001-201575

(51) Int. Cl.$^7$ ............................................. F16K 31/12
(52) U.S. Cl. ........................... 251/61; 92/98 D; 92/135; 137/907; 251/30.01
(58) Field of Search ........................ 251/61, 331, 30.01; 137/907; 92/98 D, 135

(56) References Cited

U.S. PATENT DOCUMENTS

| 3,969,041 A | * | 7/1976 | Thausing et al. .............. 251/55 |
| 4,056,043 A | | 11/1977 | Sriramamurty et al. |
| 4,111,570 A | | 9/1978 | Morel |
| 4,299,373 A | * | 11/1981 | Troyer ....................... 251/61.5 |
| 4,359,204 A | * | 11/1982 | Williams ....................... 251/331 |
| 5,054,455 A | * | 10/1991 | Cook ............................. 251/84 |
| 5,363,743 A | | 11/1994 | Raddatz et al. |
| 6,138,628 A | | 10/2000 | Alex et al. |

FOREIGN PATENT DOCUMENTS

| EP | 0 355 960 A2 | 2/1990 |
| EP | 1 083 310 A1 | 3/2001 |
| GB | 838095 | 6/1960 |
| JP | 01-193027 | 8/1989 |
| JP | 07-110010 | 4/1995 |
| JP | 11-093906 | 4/1999 |

* cited by examiner

*Primary Examiner*—John Bastianelli
(74) *Attorney, Agent, or Firm*—Rankin, Hill, Porter & Clark LLP (57) ABSTRACT

In a pressure-responsive actuator, the inside of a case is divided into first and second air chambers by a diaphragm, and a coil spring is accommodated in the second air chamber for exerting a spring force for urging the diaphragm in a direction to decrease the volume of the first air chamber. A rod is coaxially connected at one of opposite ends to a side of a retainer mounted to a central portion of the diaphragm on the side of the first air chamber and at the other end to a tip end of an arm fixed at its base end to a driven shaft rotatable about an axis perpendicular to a plane parallel to the rod. In this pressure-responsive actuator, the case is provided with a tilt-restricting portion for restricting the tilt of the rod to a range in which the contacting of the diaphragm with the inner surface of the case can be avoided.

12 Claims, 11 Drawing Sheets

PRESSURE-RESPONSIVE ACTUATOR

BACKGROUND OF THE INVENTION

The present invention relates to a pressure-responsive actuator, and particularly to an improvement in a pressure-responsive actuator in which the inside of a case is divided into first and second air chambers by a diaphragm having a peripheral edge clamped to the case; a coil spring is accommodated in the second air chamber for exerting a spring force for urging the diaphragm in a direction to decrease the volume of the first air chamber; and a rod is coaxially connected at one of opposite ends to a side of a retainer mounted to a central portion of the diaphragm on the side of the first air chamber and at the other end to a tip end of an arm fixed at its base end to a driven shaft rotatable about an axis perpendicular to a plane parallel to the rod.

Conventionally, such a pressure-responsive actuator is known, for example, from Japanese Patent Application Laid-open No. 11-93906.

In the structure in which the rod coaxially connected at one end to the retainer mounted at the central portion of the diaphragm is connected at the other end to the tip end of the arm fixed at its base end to the rotatable driven shaft, the rod reciprocates in a longitudinal direction, while being tiled about an axis parallel to the axis of the drive shaft. The conventionally known pressure-responsive actuator is constructed to allow tilt of the rod.

In the conventional actuator, however, when the diaphragm is flexed toward the first air chamber by the spring force of the coil spring by eliminating a difference in pressure between the first and second air chamber, the rod may be tilted until the diaphragm is pushed strongly against an inner surface of the case, whereby friction is generated between the inner surface of the case and the diaphragm by the movement of the rod in the longitudinal direction, because the tilt of the rod is permitted. If such friction is generated, the diaphragm is worn, resulting in a reduction in its durability.

SUMMARY OF THE INVENTION

Accordingly, it is an object of the present invention to provide a pressure-responsive actuator which can prevent the wear of the diaphragm to enhance the durability thereof.

To achieve the above object, according to the present invention, there is provided a pressure-responsive actuator in which the inside of a case is divided into first and second air chambers by a diaphragm having a peripheral edge clamped to the case wherein a coil spring is accommodated in the second air chamber for exerting a spring force for urging the diaphragm in a direction to decrease the volume of the first air chamber; and a rod is coaxially connected at one of opposite ends to a side of a retainer mounted to a central portion of the diaphragm on the side of the first air chamber and at the other end to a tip end of an arm fixed at its base end to a driven shaft rotatable about an axis perpendicular to a plane parallel to the rod, and wherein the case is provided with a tilt-restricting portion for restricting the tilt of the rod in the plane to a range in which the contacting of the diaphragm with the inner surface of the case can be avoided.

With this arrangement, the tilt of the rod is restricted, so that the diaphragm is prevented from being brought into contact with the inner surface of the case. Therefore, the friction cannot be generated between the inner surface of the case and the diaphragm by the movement of the rod in the longitudinal direction and hence, it is possible to prevent the wear of the diaphragm to enhance the durability thereof.

In a preferred feature, at least one of the case, the retainer and the rod is made of a synthetic resin. This arrangement makes it possible to provide a reduction in weight of the pressure-responsive actuator.

In a further preferred feature, the case and the rod are made of the same synthetic resin. This arrangement enables a reduction in weight of the pressure-responsive actuator and prevents only one of the tilt-restricting portion provided on the case and the rod from being worn due to the contact between the tilt-restricting portion and the rod.

In a further preferred feature, the rod is integrally connected at one end to the retainer. This arrangement can reduce the number of parts.

In a further preferred feature, the case is mounted to an intake manifold which is constructed so that the length of an intake passageway can be varied in response to the turning of a switching valve which is turnable along with the driven shaft. With this arrangement, the switching valve included in the intake manifold can be driven for switching by the pressure-responsive actuator having a simple structure and an enhanced durability.

In a further preferred feature, the intake manifold is made of a synthetic resin. With this arrangement, a load acting on the pressure-responsive actuator for actuating the switching valve, increases due to an error in shape of the intake manifold which is likely to be caused by the intake manifold being made of the synthetic resin, whereby the rod is tend to be tilted more easily. Because the tilt of the rod is restricted as described above, however, the pressure-responsive actuator can be used more effectively.

In a further preferred feature, the switching valve is made of a synthetic resin. With this arrangement, a load acting on the pressure-responsive actuator for actuating the switching valve, increases due to an error in shape of the switching valve which is likely to be caused by the switching valve being made of the synthetic resin, whereby the rod is tend to be tilted more easily. Because the tilt of the rod is restricted as described above, however, the pressure-responsive actuator can be used more effectively.

In a further preferred feature, the switching valve is constructed into a rotary type. With this arrangement, the resistance to the sliding of the switching valve is large because of the rotary type, and the load acting on the pressure-responsive actuator increases, whereby the rod is tend to be tilted more easily. Because the tilt of the rod is restricted as described above, however, the pressure-responsive actuator can be used more effectively.

In a further preferred feature, for rotatable connection between the arm and the rod made of a synthetic resin, the arm has a pillow ball provided thereon; the rod is provided at the other end thereof with a fitting bore having at its intermediate portion an annular recess for supporting the pillow ball, and the rod has a plurality of notches provided therein to be open at least in a side of the fitting bore to which the pillow ball is fitted, the notches leading to the fitting bore at a plurality of circumferential points in the fitting bore. With this arrangement, when the pillow ball is fitted into the fitting bore, while temporarily deforming a portion of the rod, a stress acting on the rod around the fitting bore is alleviated by the presence of the plurality of notches, and the need for a special treatment such as a rod-warming treatment can be eliminated. As a result, the number of assembling steps for rotatably connecting the arm and the rod to each other can be reduced, so that the assembling operation is facilitated.

In a further preferred feature, first notch, second and third notches are provided in the other end of the rod to extend radially from the fitting bore, the first notch extending in a longitudinal direction of the rod, the second and third notches being disposed at locations where they are spaced at the same distance apart from the first notch, and the second and third notches being defined to have a length shorter than that of the first notch. With this arrangement, the first notch can be defined to have a sufficiently large length, and a sufficient number of notches can be provided in the rod, while avoiding an enlargement in end size of the rod. In addition, the stress acting on the rod around the fitting bore can be alleviated sufficiently.

In a further preferred feature, a cover portion is integrally provided on a portion of the case and fastened to the intake manifold so as to cover a connection between the rod and the driven shaft, and among a plurality of bolts for fastening the cover portion to the intake manifold, a pair of bolts are disposed at locations where the rod is interposed between the driven shaft and the diaphragm.

With this arrangement, the cover portion is integrally provided on a portion of the case so as to cover the connection between the rod and the driven shaft, and is fastened to the intake manifold. Therefore, the actuator can be fixed to and supported on the intake manifold with a reduced number of parts. Moreover, among the plurality of bolts for fastening the cover portion to the intake manifold, the pair of bolts are disposed at locations where the rod is interposed between the driven shaft and the diaphragm. Therefore, even if the actuator having a relatively large weight is disposed to protrude from the cover portion mounted to the intake manifold, it is possible to inhibit, to the utmost, that the vibration due to the oscillation of the actuator acts on the cover portion, and it is possible to prevent the vibration due to the oscillation of the actuator from exerting an adverse effect to the detection accuracy of a detector.

In a further preferred feature, the cover portion is fastened to the intake manifold through a mounting plate interposed between the cover portion and the intake manifold, and a detector housing of a detector for detecting the rotated position of the driven shaft is mounted to the cover portion. With such arrangement, the case having the cover portion, the detector and the mounting plate can be previously assembled together as a unit, and the unit can be mounted to the intake manifold, whereby the assembling operation is facilitated.

BRIEF DESCRIPTION OF THE DRAWINGS

FIGS. 1 to 8 show a first embodiment of the present invention.

FIGS. 9 to 11 show a second embodiment of the present invention.

DESCRIPTION OF THE PREFERRED EMBODIMENTS

Figure 1:
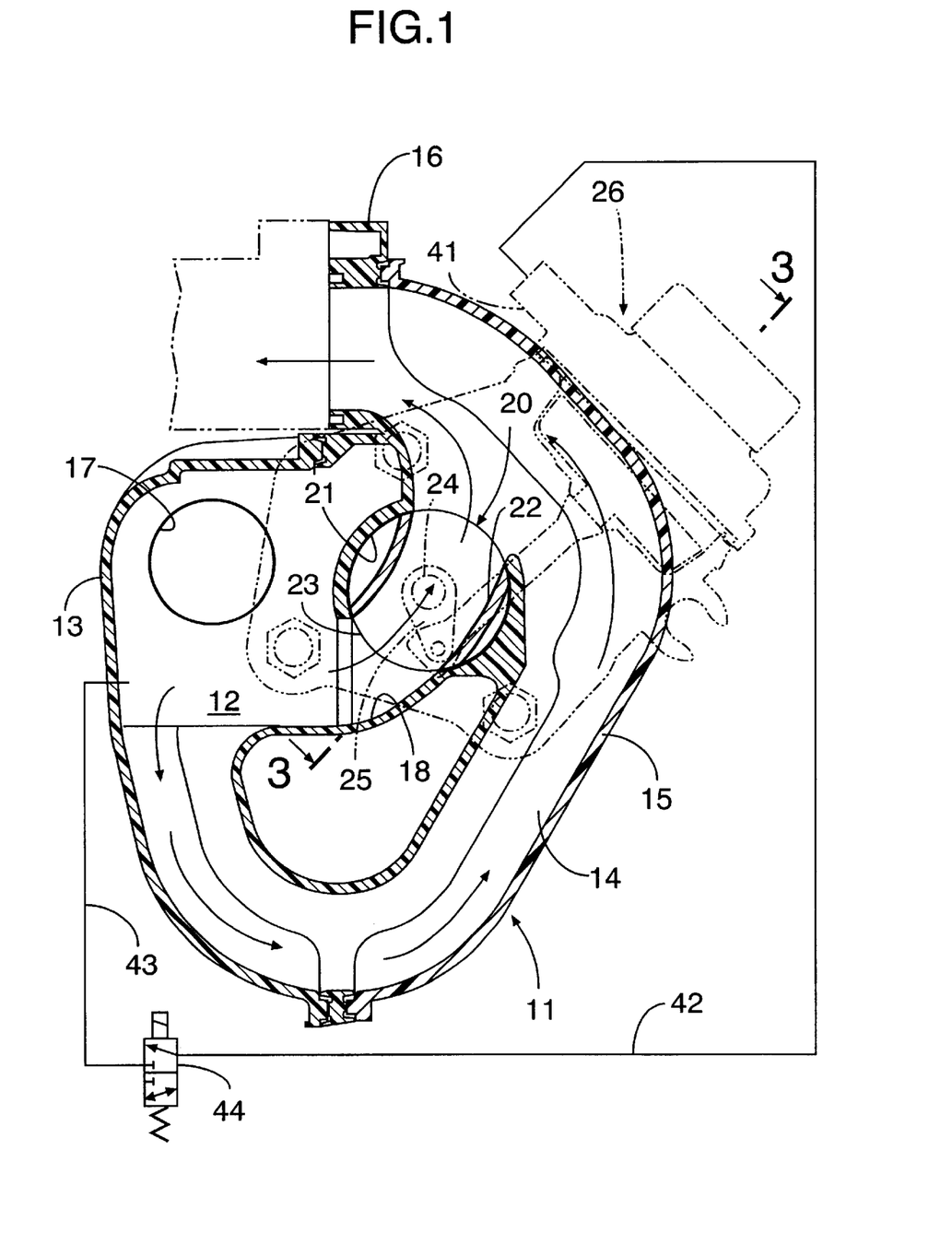
FIG. 1 is a vertical sectional view of an intake manifold in a high-speed operational state of an engine.
Figure 2:
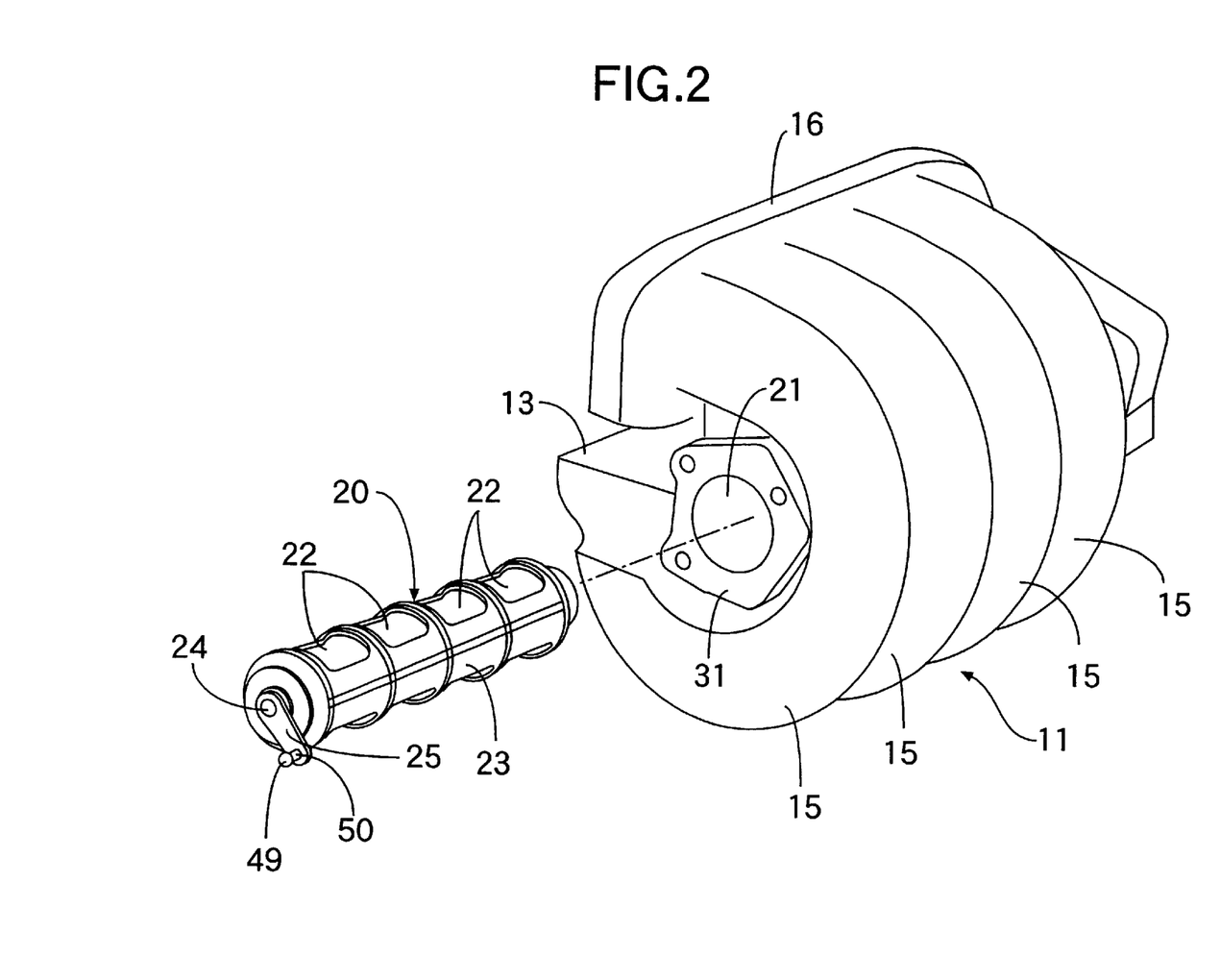
FIG. 2 is an exploded perspective view of the intake manifold and a switching valve.

A first embodiment of the present invention will now be described with reference to FIGS. 1 to 8. Referring first to FIGS. 1 and 2, an intake manifold 11 is for use with a 4-cylinder engine and constructed by welding a plurality of, e.g., three members made of a synthetic resin to one another. The intake manifold 11 includes a surge tank 13 defining an intake air chamber 12, four independent branch pipes 15 each connected commonly at one end to the surge tank 13 to define main intake passages 14 leading to the intake air chamber 12, and an engine-mounting flange 16 connected commonly to the other ends of the branch pipes 15.

An atmospheric air introducing port 17 is provided in one end of the surge tank 13 in a direction of arrangement of the branch pipes 15, and an air cleaner is connected to the atmospheric air introducing port 17 through a throttle body (not shown) so that an amount of atmospheric air corresponding to an opening degree of a throttle in a throttle body is introduced into the intake air chamber 12.

The branch pipes 15 each connected at one end to a lower portion of the surge tank 13 are formed so as to be curved into a substantially C-shape, and disposed horizontally in parallel to one another. The engine-mounting flange 16 connected commonly to the other ends of the branch pipes 15 is disposed above the surge tank 13.

The intake manifold 11 is provided with subsidiary intake passages 18, each of which opens at one end into the intake air chamber 12 and at the other end into the middle of the corresponding main intake passage 14. The length of a passageway extending from the inside of the intake air chamber 12 via the subsidiary intake passages 18 and the main intake passages 14 to the engine is set shorter than that of a passageway extending from the inside of the intake air chamber 12 via the main intake passages 14 to the engine.

The opening and the shutting-off of the subsidiary intake passages 18 are switched over from one to the other by a rotary-type switching valve 20 rotatably carried in the intake manifold 11. A plurality of support bores 21 circular in section are provided in the intake manifold 11 to traverse intermediate portions of the subsidiary intake passages 18. The switching valve 20 comprises a drum 23 which is formed into a columnar shape and made of a synthetic resin and which has passage bores 22 individually corresponding to the subsidiary intake passages 18. The drum 23 is fitted in a support bore 21 for turning about an axis between a position to communicate the subsidiary intake passages 18 with the passage bores 22 corresponding to the subsidiary intake passages 18, as shown in FIG. 1, and a position to shut off the subsidiary intake passages 18 in such a manner that opposite ends of the passage bores 22 are closed by an inner surface of the support bore 21.

A driven shaft 24 is mounted coaxially at one end of the drum 23 opposite from the throttle body. A base end of an arm 25 extending radially outwards of the driven shaft 24 is fixed to the driven shaft 24, and a pressure-responsive actuator 26 is connected to a tip end of the arm 25.

Figure 3:
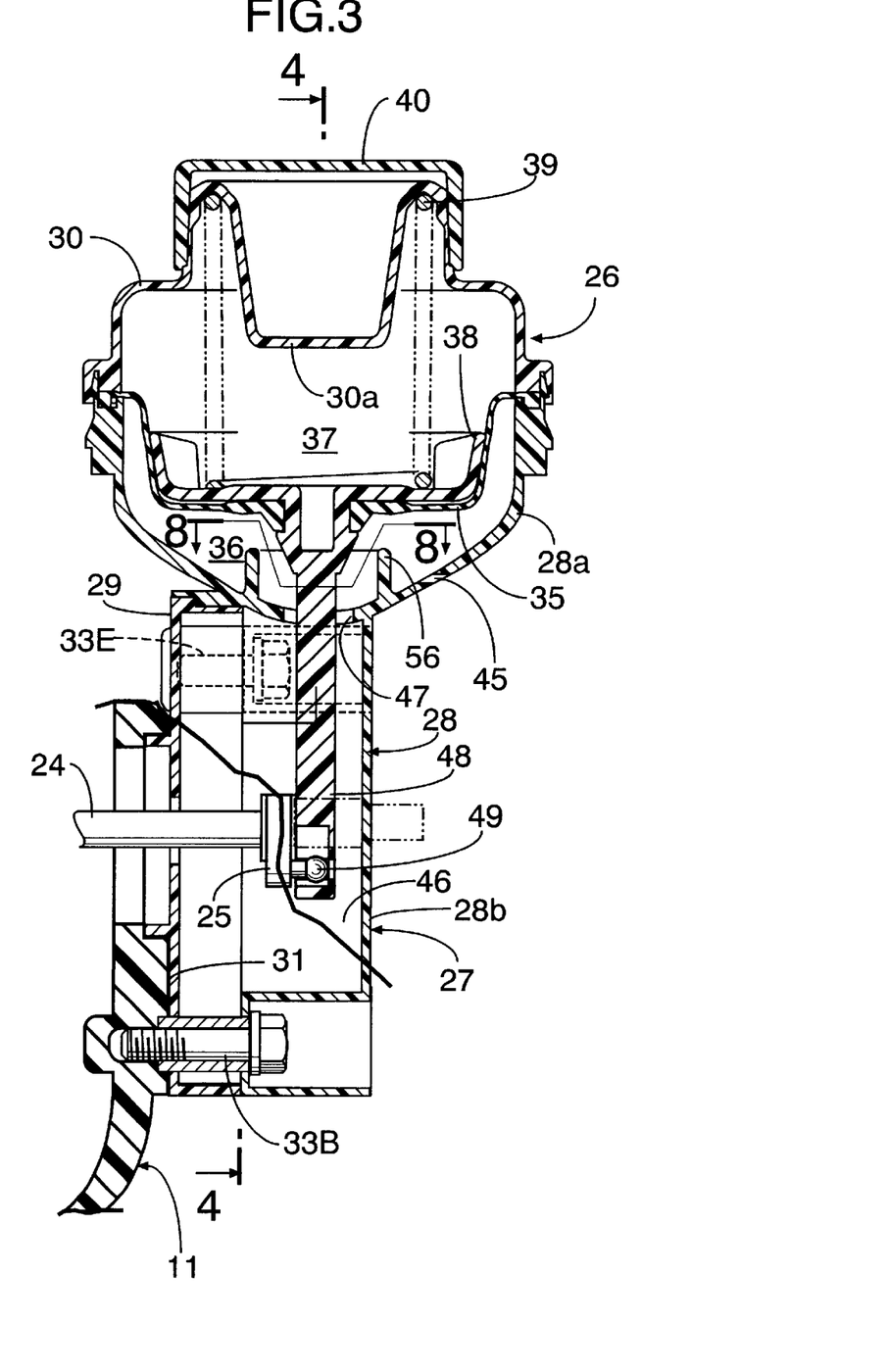
FIG. 3 is a sectional view of a pressure-responsive actuator, taken in a direction along a line 3—3 in FIG. 1.
Figure 4:
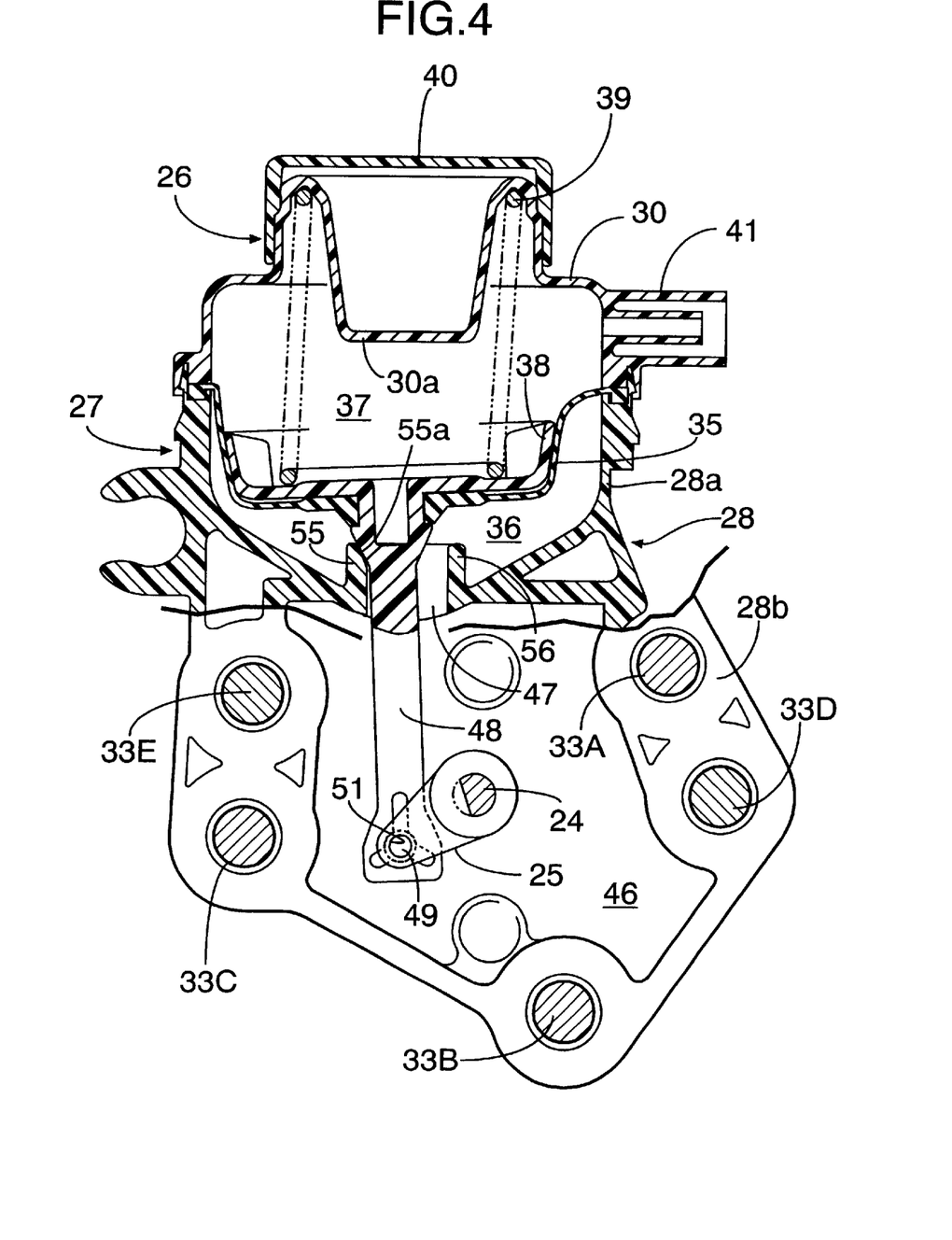
FIG. 4 is a sectional view taken along a line 4—4 in FIG. 3.

Referring to FIGS. 3 and 4, a case 27 of the pressure-responsive actuator 26 comprises a case member 28 made of a synthetic resin, and a cover 30 made of a synthetic resin and fastened to the case member 28.

The case member 28 is integrally provided with a bowl-shaped portion 28a which opens toward the cover 30, and a cover portion 28b for covering a connection of the actuator 26 to the driven shaft 24, and the cover 30 is fastened to the bowl-shaped portion 28a.

A peripheral edge of a diaphragm 35 is clamed between the bowl-shaped portion 28a of the case member 28 and the cover 30. A space between the bowl-shaped portion 28a and the cover 30 in the case 27 is divided by the diaphragm 35 into a first air chamber 36 adjacent the bow-shaped portion 28a and a second air chamber 37 adjacent the cover 30.

A bowl-shaped retainer 38 is mounted at a central portion of the diaphragm 35 in the second air chamber 37, and a coil spring 39 accommodated in the second air chamber 37 is mounted under compression between the cover 30 and the retainer 38 to exert a spring force for urging the diaphragm 35 in a direction to reduce the volume of the first air chamber 36.

A cylindrical guide tube 30a is integrally provided at a central portion of the cover 30 to extend into the second air chamber 37, and one end of the coil spring 39 abuts against the cover 30 to surround the guide tube 30a. Moreover, a cap 40 is mounted to the cover 30 to cover a recess defined in an outer surface by the provision of the guide tube 30a.

A connecting double-tube portion 41 is integrally provided on the cover 30, and a line 42 leading to the second air chamber 37 is connected to the connecting tube portion 41, as shown in FIG. 1. A line 43 is connected to the intake air chamber 12 in the intake manifold 11, and an electromagnetic switching valve 44 is incorporated between the lines 42 and 43. An open bore 45 (see FIG. 3) is provided in the bowl-shaped portion 28a of the case member 28 to permit the second air chamber 36 to communicate to the outside.

The electromagnetic switching valve 44 is adapted to switch over a state in which the lines 42 and 43 are put into communication with each other, when the engine revolution speed is, for example, in a low/medium revolution speed range equal to or lower than about 4,500 rpm, and a state in which the line 42 is opened to the air (a state shown in FIG. 1), when the engine revolution speed is, for example, in a high revolution speed range exceeding about 4,500 rpm in accordance with the operational state of the engine.

In the low/medium revolution speed range of the engine, a negative pressure in the intake air chamber 12 is introduced through the line 43, the electromagnetic switching valve 44 and the line 42 into the second air chamber 37, whereby the diaphragm 35 is flexed toward a side to decrease the volume of the second air chamber 37 against the spring force of the coil spring 39. In the high revolution speed range of the engine, the atmospheric pressure is introduced from the electromagnetic switching valve 44 through the line 42 into the second air chamber 37, whereby the diaphragm 35 is flexed toward a side to decrease the volume of the first air chamber 36 by the spring force of the coil spring 39.

The cover portion 28b of the case member 28 is fastened to a fastening seat 31 provided on the intake manifold 11 with a mounting plate 29 made of synthetic resin being interposed therebetween. An operating chamber 46 is defined between the cover portion 28b and the mounting plate 29. A communication bore 47 is provided in a bottom of the bowl-shaped portion 28a of the case member 28 to connect the first air chamber 36 and the operating chamber 46 to each other, and a rod 48 extending through the communication bore 47 is coaxially connected at one end to the portion on the side of the first air chamber 36 of the retainer 38 which is mounted at the central portion of the diaphragm 35.

The cover portion 28b and the mounting plate 29 are commonly fastened to the fastening seat 31, for example, by three bolts 33A, 33B and 33C inserted through the cover portion 28b and the mounting plate 29 and screwed into the fastening seat 31. The cover portion 28b is fastened to the mounting plate 29, for example, by two bolts 33D and 33E.

Namely, the cover portion 28b is fastened to the fastening seat 31 of the intake manifold 11, for example, by the five bolts 33A to 33E, but among the bolts 33A to 33E, a pair of the bolts 33A and 33E are disposed at locations where the rod 48 is interposed between the driven shaft 24 and the diaphragm 35.

At least one of the case 27, the retainer 38 and the rod 48, all in the present embodiment, is or are made of the same synthetic resin and moreover, one end of the rod 48 is integrally connected to the retainer 38.

The driven shaft 24 mounted at one end of the drum 23 of the switching valve 20 is mounted to enter into the operating chamber 46 for rotation about an axis perpendicular to a plane parallel to the rod 48, and the arm 25 is fixed at its base end to the driven shaft 24 within the operating chamber 46.

A base end of a connecting shaft 50 having an axis parallel to the driven shaft 24 is integrally provided at the tip end of the arm 25, and a pillow ball 49 provided at a tip end of the connecting shaft 50 is fitted into and connected to the other end of the rod 48. Namely, the rod 48 is connected at the other end to the tip end of the arm 25 for rotation about an axis parallel to the axis of the driven shaft 24.

Figure 5:
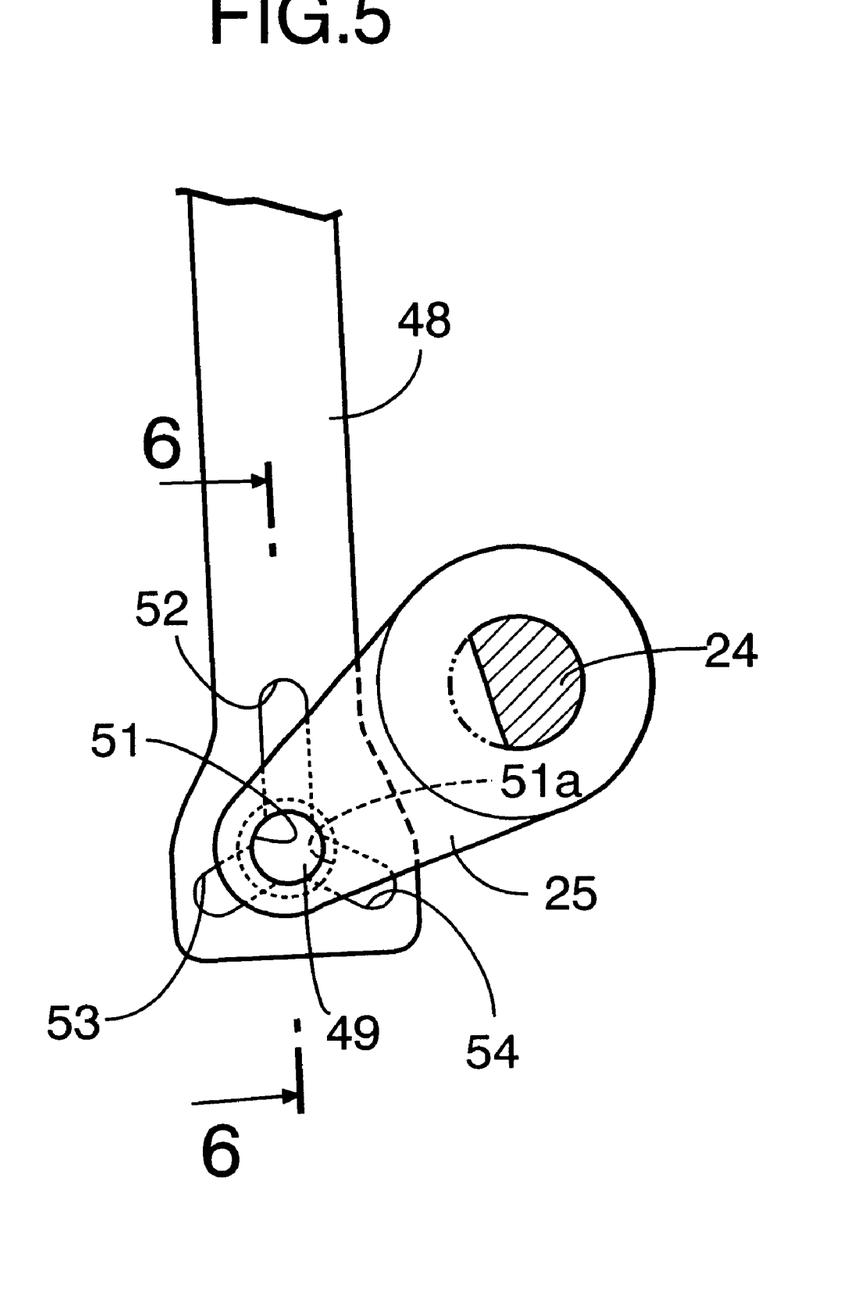
FIG. 5 is an enlarged view of a connection between a rod and an arm.
Figure 6:
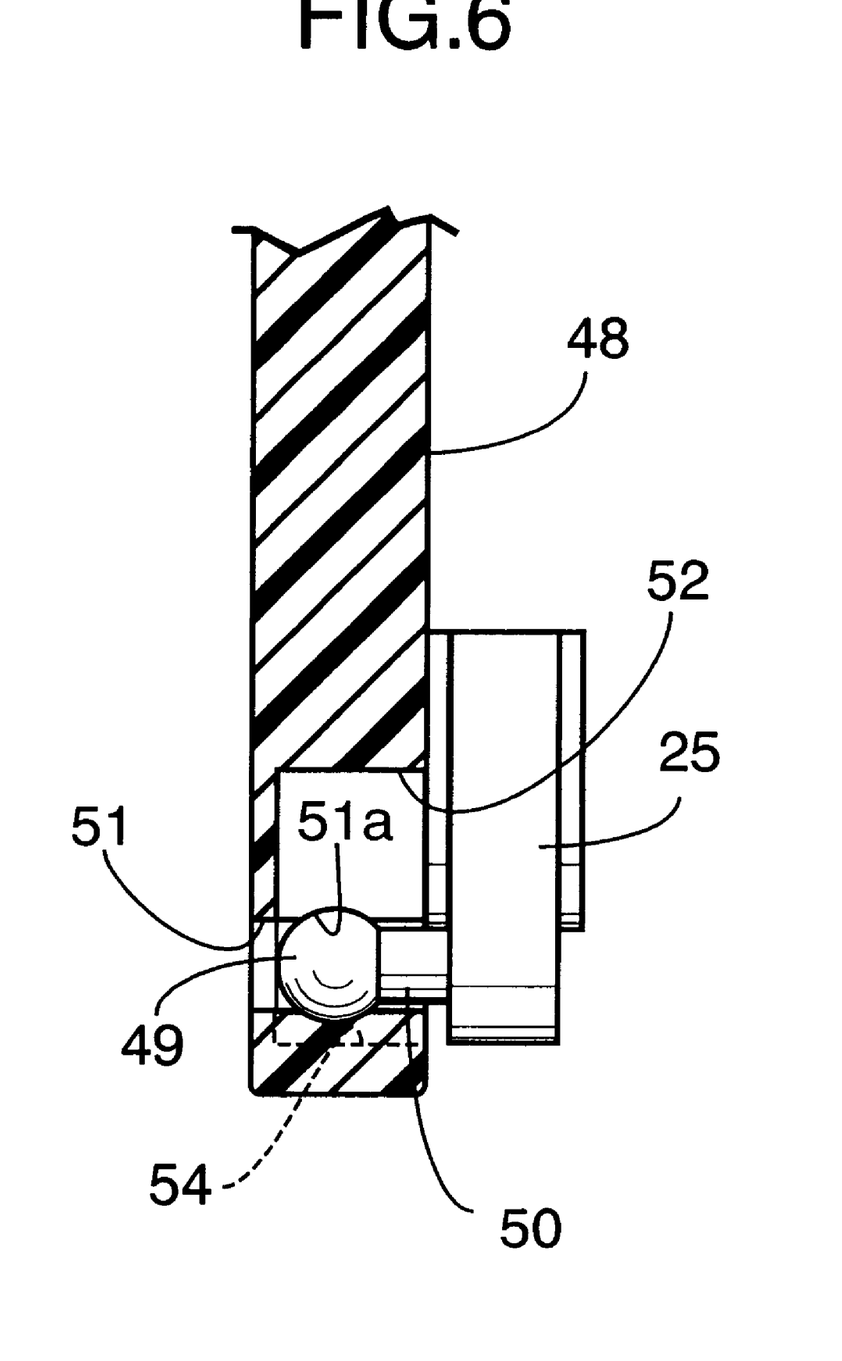
FIG. 6 is a sectional view taken along a line 6—6 in FIG. 5.

Referring to FIGS. 5 and 6, a fitting bore 51 is provided in the other end of the rod to extend between its opposite surfaces, so that the pillow ball 49 provided at the tip end of the connecting shaft 50 at the tip end of the arm 25 is fitted into the fitting bore 51. The fitting bore 51 has a diameter smaller than that of the pillow ball 49. An annular recess 51a is defined to have an intermediate portion of the fitting bore 51 for rotatably supporting the pillow ball 49 fitted into the fitting bore 51, while temporarily deforming the other end of the rod 48.

Moreover, a plurality of, e.g., three notches 52, 53 and 54 are provided in the other end of the rod 48 to lead to the fitting bore 51 in such a manner that they extend radially from the fitting bore 51 and are open in a surface permitting the pillow ball 49 to be fitted into the fitting bore 51. The first notch 52 is defined to have a relatively large length to extend in a longitudinal direction of the rod 48, while the second and third notches 53 and 54 are defined to have a relatively small length at locations where they are spaced at the same distance apart from the first notch 52.

Figure 7:
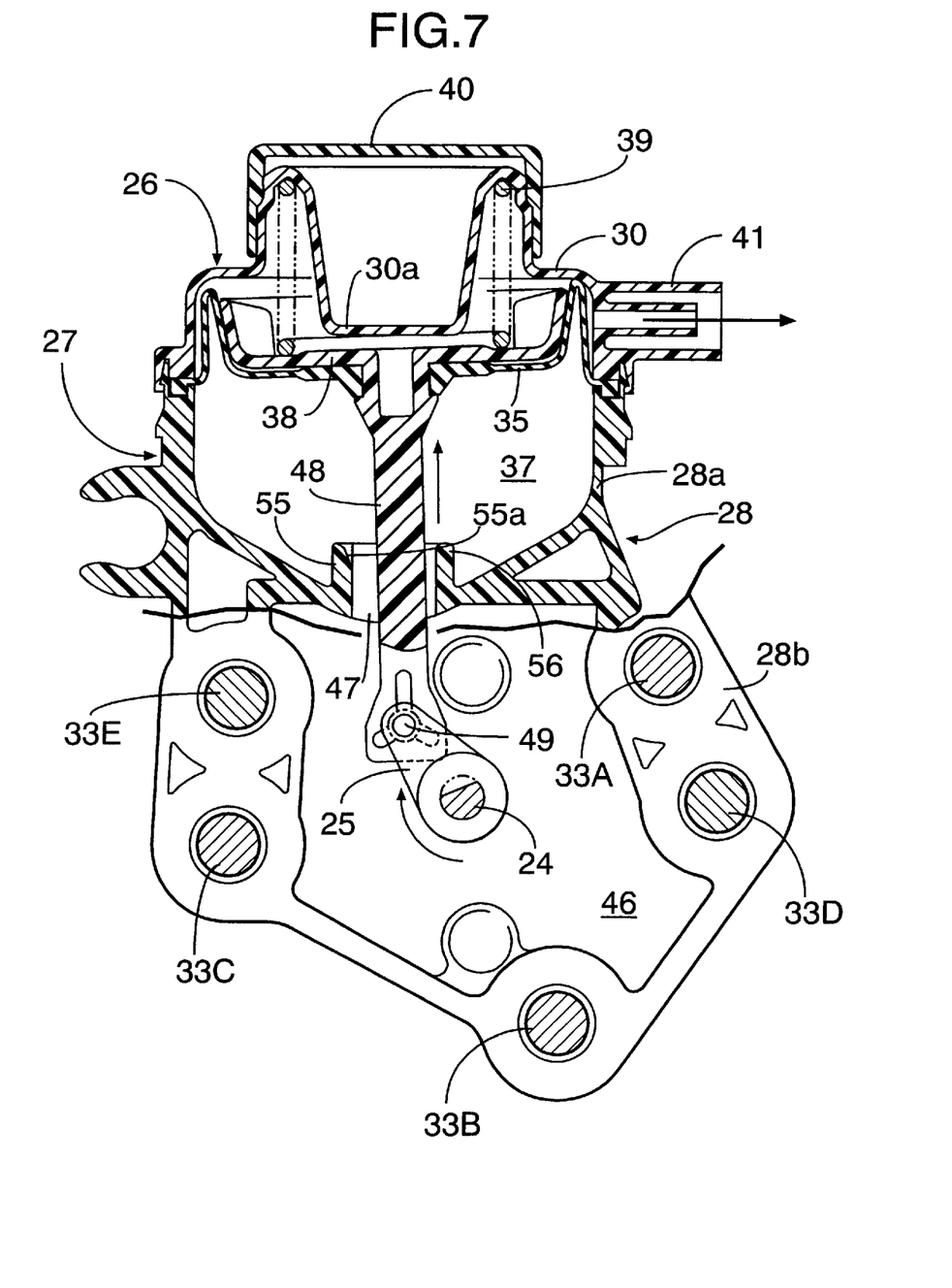
FIG. 7 is a sectional view of the pressure-responsive actuator, similar to FIG. 4, but in a low/medium-speed operational state of the engine.

In the low/medium revolution speed range of the engine, the diaphragm 35 is flexed to the side to decrease the volume of the second air chamber 37 in response to the introduction of the negative pressure in the intake air chamber 12 into the second air chamber 37, whereby the rod 48 is moved toward the second air chamber 37, as shown in FIG. 7. In response to this, the switching valve 20 in the intake manifold 11 is turned to the position to shut off the subsidiary intake passages 18. In the high revolution speed range of the engine, the diaphragm 35 is flexed to the side to decrease the volume of the first air chamber 36 by the spring force of the coil spring 39, whereby the rod 48 is moved toward the operating chamber 46, as shown in FIGS. 3 and 4, and in response to this, the switching valve 20 in the intake manifold 11 is turned to the position to open the subsidiary intake passages 18.

During movement of the rod 48 in the longitudinal direction, the rod 48 is tilted about the connecting shaft 50 having the axis parallel to the axis of the driven shaft 24, and the connecting bore 47 connecting the first air chamber 36 and the operating chamber 46 to each other is formed into an elongated shape which permits the tilt of the rod 48.

Therefore, when the diaphragm 35 is flexed toward the first air chamber 36 by the spring force of the coil spring 39 in the high revolution speed of the engine, a force for rotating the rod 48 in a counterclockwise direction in FIG. 7 about the axis of the connecting shaft 50 is applied from the coil spring 39 to the rod 48, because the rod 48 coaxially connected at one end to the retainer 38 mounted at the central portion of the diaphragm 35 is connected at the other end thereof, for rotation about the axis parallel to the axis of the driven shaft 24, to the tip end of the arm 25 fixed at its base end to the driven shaft 24 which is rotatable about the axis perpendicular to the plane parallel to the rod 48. For this reason, if the tilting of the rod 48 is permitted freely, the diaphragm 35 may be pushed strongly against the inner surface of the bowl-shaped portion 28a. Therefore, a tilt-restricting portion 55 for restricting the tilt of the rod 48 is provided at the bottom of the bowl-shaped portion 28a.

The tilt-restricting portion 55 restricts the tilt of the rod 48 in a plane perpendicular to the driven shaft 24 and including the rod 48 to a range in which the contacting of the diaphragm 35 with the inner surface of the bowl-shaped portion 28a of the case member 28 can be avoided. The tilt-restricting portion 55 is provided with a recess 55a for stabilizing the position of the rod 48 in a direction perpendicular to a tilting direction.

Figure 8:
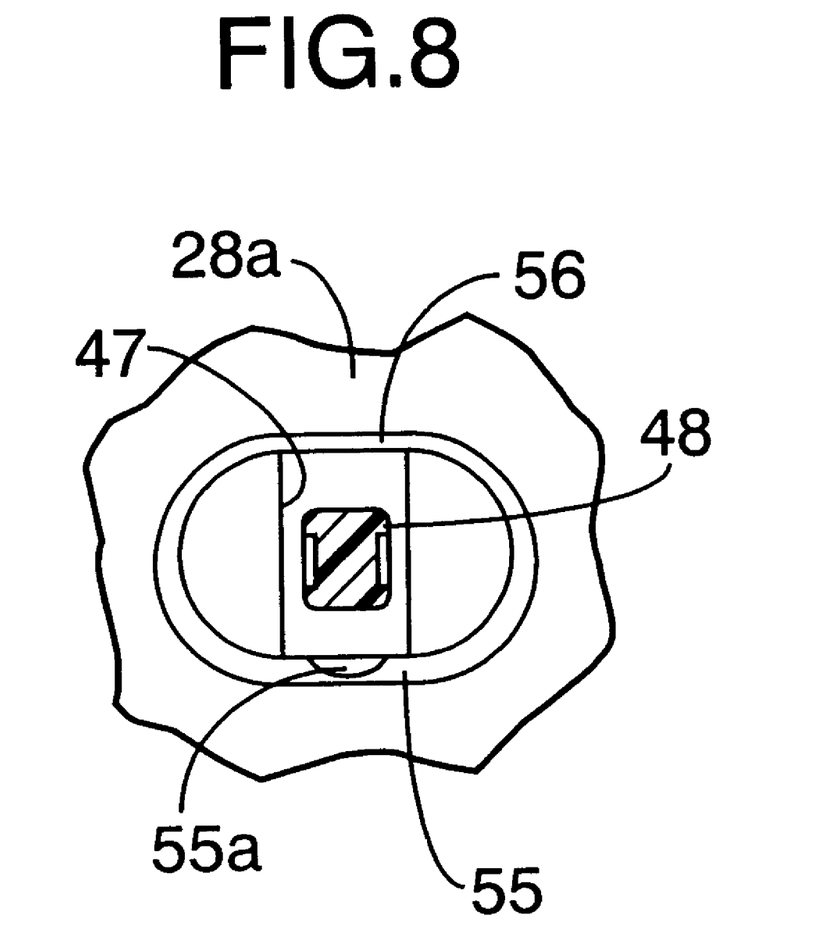
FIG. 8 is a sectional view taken along a line 8—8 in FIG. 3.

A reinforcing rib 56 formed, for example, into an elliptic shape to reinforce the periphery of the connecting bore 47, as shown in FIG. 8, is integrally, projectingly provided on the bottom of the bowl-shaped portion 28a to surround the connecting bore 47, and the tilt-restricting portion 55 is formed by increasing the thickness of a portion of the reinforcing rib 56.

The operation of the first embodiment will be described below. The rod 48 included in the pressure-responsive actuator 26 is connected, for rotation about the axis parallel to the axis of the driven shaft 24, to the tip end of the arm 25 which is fixed at its base end to the driven shaft 24 rotatable about the axis perpendicular to the plane parallel to the rod 48. The case member 28 of the case 27 of the pressure-responsive actuator 26 is provided with the tilt-restricting portion 55 for restricting the tilt of the rod 48 in the plane to the range in which the contacting of the diaphragm 35 with the inner surface of the bowl-shaped portion 28a of the case member 28 can be avoided.

Therefore, the tilt of the rod 48 is restricted, so that the diaphragm 35 is prevented from being brought into contact with the inner surface of the case member 28 and hence, the friction cannot be generated between the inner surface of the case member 28 and the diaphragm 35 due to the movement of the rod 48 in the longitudinal direction. Thus, it is possible to prevent the wear of the diaphragm 35 to enhance its durability.

At least one of the case 27, the retainer 38 and the rod 48, all in the present embodiment, is or are made of the synthetic resin and hence, the weight of the pressure-responsive actuator 26 can be reduced. In addition, because the rod 48 is integrally connected at one end to the retainer 38, the number of parts can be reduced. Moreover, because the case 27 and the rod 48 are made of the same synthetic resin, it is possible to prevent only one of the tilt-restricting portion 55 included in the case 27 and the rod 48 from being worn due to the mutual contact of the tilt-restricting portion 55 and the rod 48.

The case 27 of the pressure-responsive actuator 26 is mounted to the intake manifold 11 constructed so that the length of the intake passageway can be varied in response to the turning of the switching valve 20 turned along with the driven shaft 24, and the switching valve 20 included in the intake manifold 11 can be driven for switching by the pressure-responsive actuator 26 having an enhanced durability and a simple structure.

Further, because the intake manifold 11 is formed of the synthetic resin, a load acting on the pressure-responsive actuator 26 for actuating the switching valve 20 may increase due to an error in shape of the intake manifold 11 which is likely to be caused by the intake manifold 11 being formed of the synthetic resin. The rod 48 is tilted more easily in accordance with such increase in load, but the tilt of the rod 48 is restricted as described above and hence, the pressure-responsive actuator 26 can be used more effectively.

Moreover, an error in shape of the switching valve may be caused by the intake manifold 11 being formed of the synthetic resin. The load acting on the pressure-responsive actuator 26 for actuating the switching valve 20 increases due to such error in shape, whereby the rod 48 is tilted more easily. Because the tilt of the rod 48 is restricted as described above, however, the pressure-responsive actuator 26 can be used more effectively.

In addition, because the switching valve 20 is constructed into the rotary type, the resistance to the sliding movement of the switching valve 20 is large and thus, the load acting on the pressure-responsive actuator 26 increases, thereby facilitating the tilt of the rod 48. Because the tilt of the rod 48 is restricted as described above, however, the pressure-responsive actuator 26 can be used more effectively.

Further, in order to fit and connect the pillow ball 49 provided at the tip end of the arm 25 fixed at its base end to the driven shaft 24 of the switching valve 20, the fitting bore 51 provided at its intermediate portion with the annular recess 51a for supporting the pillow ball 49 is provided in the other end of the rod 48, and the plurality of, e.g., three notches 52, 53 and 54 are provided in the other end of the rod 48 to lead to the fitting bore 51 in such a manner that they extend radially from the fitting bore 51 and are open into the surface permitting the pillow ball 49 to be fitted into the fitting bore 51.

Therefore, when the pillow ball 49 is fitted into the fitting bore 51, while temporarily deforming a portion of the other end of the rod 48, a stress acting on the rod around the fitting bore 51 is alleviated by the three notches 52 to 54, and the pillow ball 49 can be fitted into the fitting bore 51, thereby eliminating the need for a special treatment such as a treatment for warming the rod 48. As a result, it is possible to reduce the number of assembling steps for assembling the pressure-responsive actuator 26 to the intake manifold 11 by connecting the arm 25 and the rod 48 to each other, and to facilitate the assembling operation.

Moreover, among the three notches 52 to 54 provided at the other end of the rod 48, the first notch 52 defined to have the relatively large length to extend in the longitudinal direction of the rod 48, while the second and third notches 53 and 54 are defined to have the relatively small length at locations where they are spaced at the same distance apart from the first notch 52. Because the notches 52 to 54 are disposed with such shapes as described above, the first notch 52 can be formed sufficiently long, and the sufficient number of the notches 52 to 54 can be provided in the other end of the rod 48, while avoiding an enlargement in shape of the end of the rod 48, and the stress acting on the rod 48 around the fitting bore 51 can be alleviated sufficiently.

Further, because the cover portion 28b for covering the connection between the rod 48 and the driven shaft 24 is integrally provided on the case member 28 which is a portion of the case 27, and the cover portion 28b is fastened to the intake manifold 11, the actuator 26 can be fixed to and supported on the intake manifold 11 with a decreased number of parts, as compared with a system where an actuator is supported on a stay fixed to an intake manifold 11.

Furthermore, among the plurality of, e.g., five bolts 33A to 33E for fastening the cover portion 28b to the intake manifold 11, a pair of the bolts 33A and 33E are disposed at the locations where the rod 48 is interposed between the driven shaft 24 and the diaphragm 35. Therefore, even if the actuator 26 having a relatively large weight is disposed to protrude from the cover portion 28b mounted to the intake manifold 11, it can be inhibited to the utmost that the vibration due to the oscillation of the actuator 26 acts on the cover portion 28b.

Figure 9:
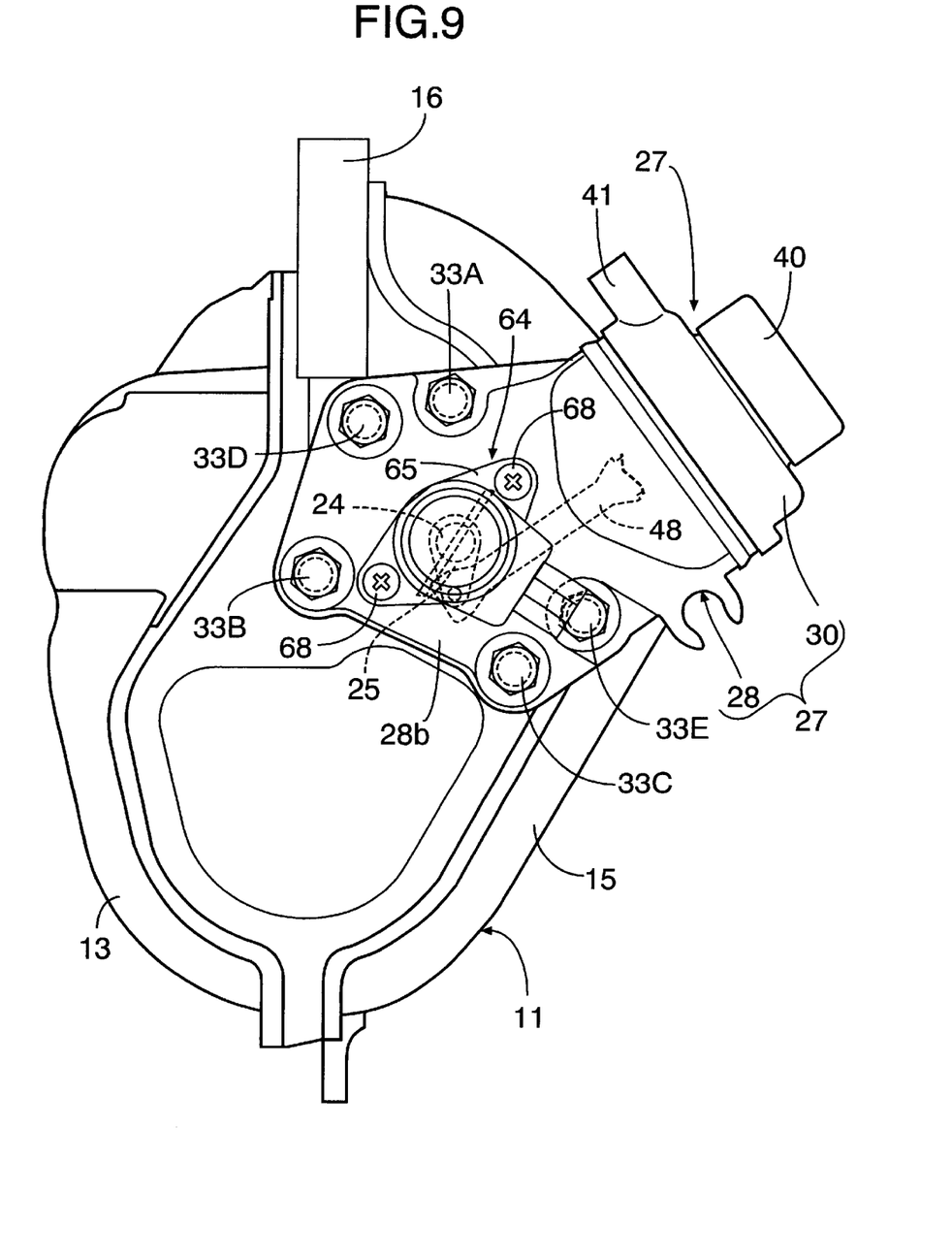
FIG. 9 is a side view of a variable intake system.
Figure 10:
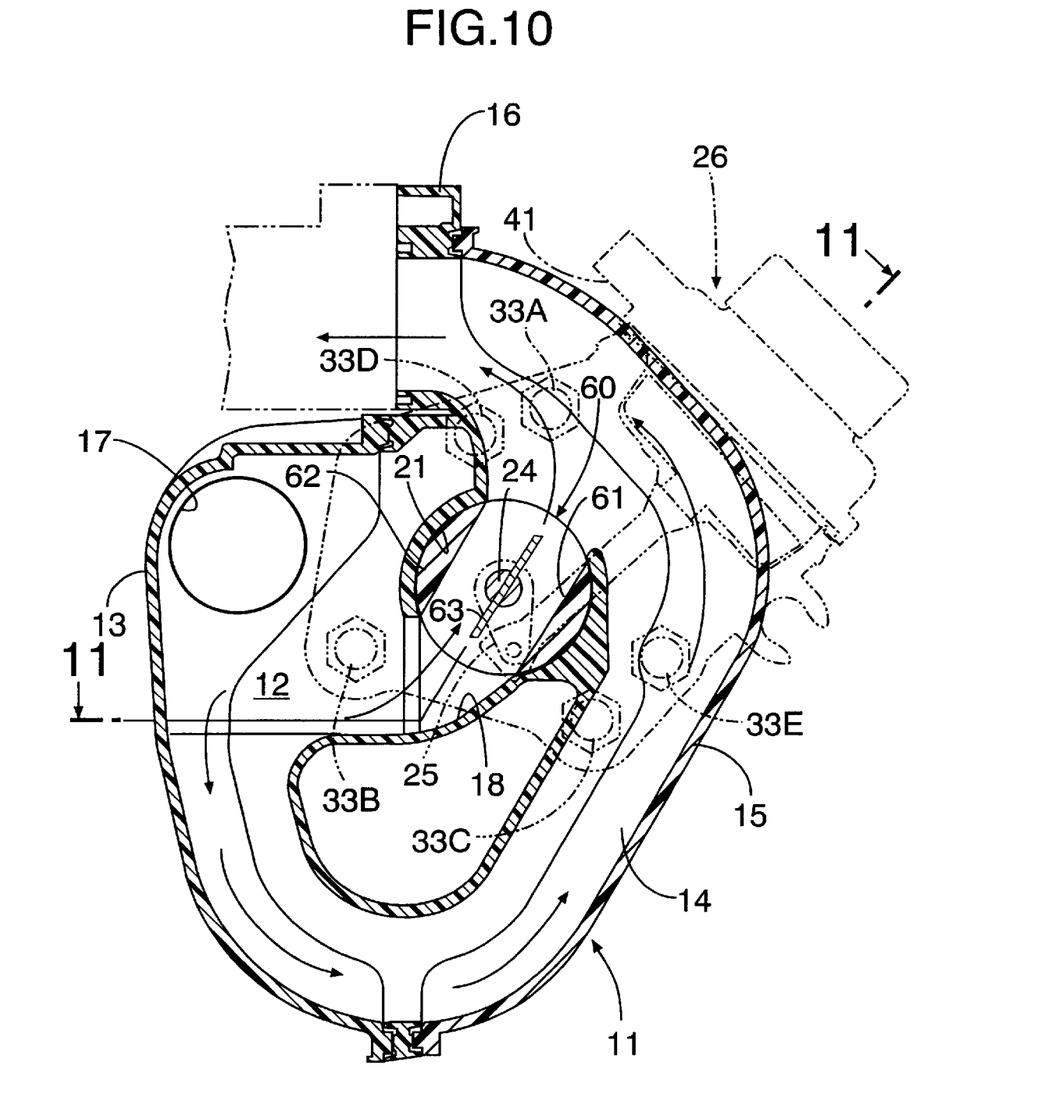
FIG. 10 is a vertical sectional view of the variable intake system, taken in the same direction as in FIG. 9.
Figure 11:
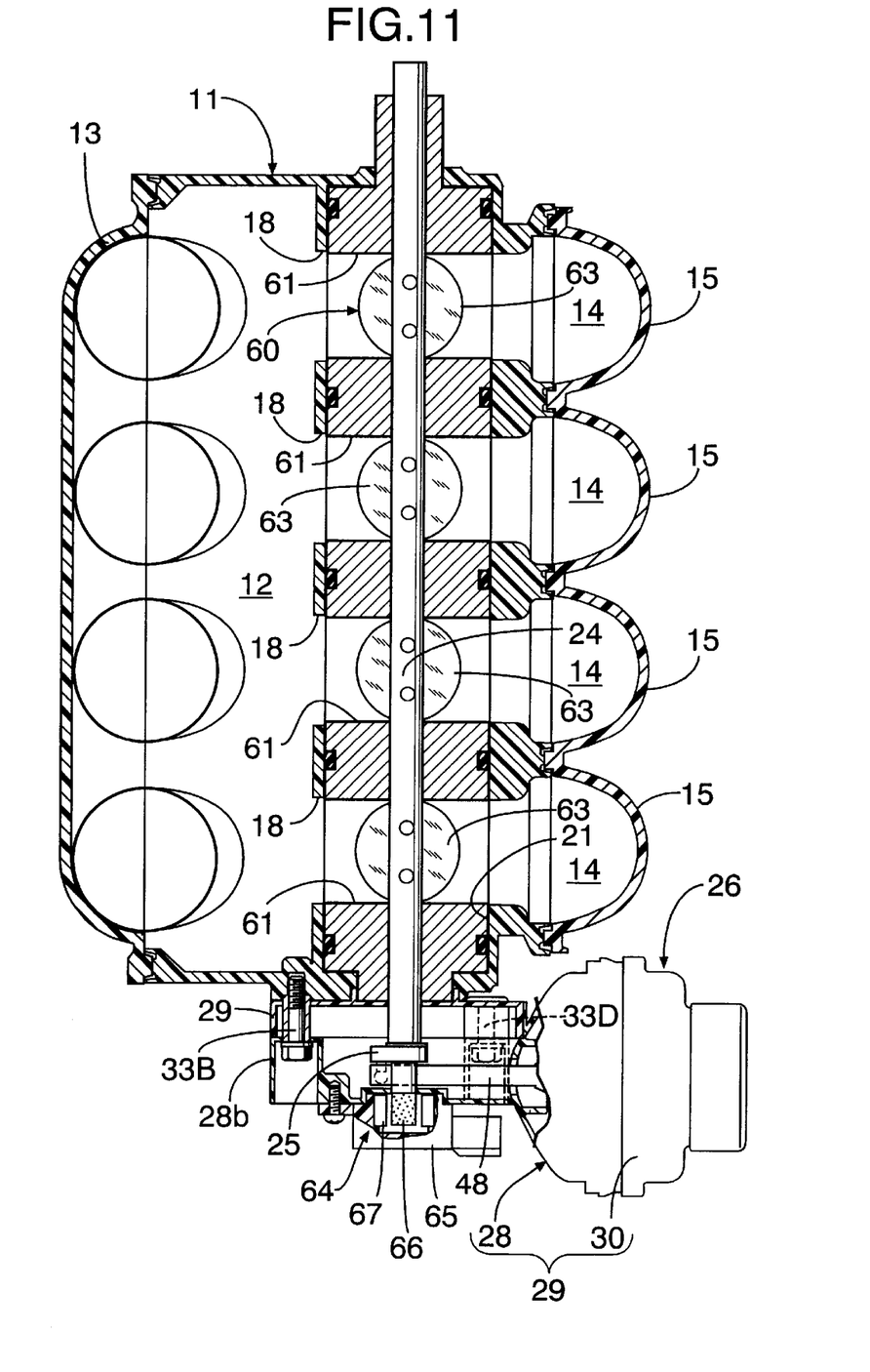
FIG. 11 is a sectional view taken along a line 11—11 in FIG. 10.

A second embodiment of the present invention will now be described with reference to FIGS. 9 to 11. An intake manifold 11 for use with a 4-cylinder engine includes, as in the first embodiment, a surge tank 13 defining an intake air chamber 12, four independent branch pipes 15 each connected commonly at one end to the surge tank 13 to define main intake passages 14 leading to the intake air chamber 12, respectively, and an engine-mounting flange 16 connected commonly to the other ends of the branch pipes 15.

Subsidiary intake passages 18 are provided in the intake manifold 11 and each open at one end into the intake air chamber 12 and at the other end into the middle of the corresponding main intake passage 14. The length of an intake passageway extending from the inside of the intake air chamber 12 via the subsidiary intake passages 18 and the main intake passages 14 to the engine is set shorter than that of an intake passageway extending from the inside of the intake air chamber 12 via the main intake passages 14 to the engine.

The length of the intake passageway in the intake manifold is switched over by switching over the opening and the shutting-off of the subsidiary intake passages 18 from one to the other in accordance with the revolution speed of the engine. A switching valve 60 for switching over the opening and the shutting-off of the subsidiary intake passages 18 from one to the other is rotatably carried in the intake manifold 11.

The switching valve 60 includes a valve housing 62 formed into a columnar shape and having passage bores 61 individually corresponding to the subsidiary intake passages 18, a driven shaft 24 rotatably carried in the valve housing between the passage bores 61 to extend coaxially through the valve housing 62, and butterfly-type valve members 63 fixed to the driven shaft 24 so that they can close the passage bores 61.

The driven shaft 24 and the valve members 63 may be integrally formed of a synthetic resin, but in order to increase the rigidity and to enhance the assembling accuracy, it is preferable that the driven shaft 24 and the valve members 63 are formed of a metal.

The valve housing 62 is fitted into and fixed in a support bore 21 which is circular in cross section and which is provided in the intake manifold 11 to traverse intermediate portions of the subsidiary intake passages 18. Namely, the driven shaft 24 is rotatably supported on the intake manifold 11 with the valve housing 62 interposed therebetween.

An arm 25 is fixed at its base end to one end of the driven shaft 24, and a rod 48 of an actuator 26 is connected to a tip end of the arm 25. The actuator 26 is of a diaphragm type having an operating axis in a plane perpendicular to an axis of the driven shaft 24, and operates the rod in an axial direction in accordance with the revolution speed of the engine. Thus, in a low/medium revolution speed range of the engine, a negative pressure in the intake air chamber 12 is introduced into the actuator 26, and in response to this, the actuator 26 moves the rod 48 rightwards in FIG. 11, whereby an intake valve 60 is turned to a position to close the subsidiary intake passages 18. In a high revolution speed range of the engine, the actuator 26 moves the rod 48 leftwards in FIG. 11, whereby the intake valve 60 is turned to a position to open the subsidiary intake passages 18.

A case 27 included in the actuator 26 comprises a case member 28 made of a synthetic resin, and a cover 30 made of a synthetic resin and fastened to the case member 28. The case member 28 is formed into a bowl shape to constitute the case 27 by cooperation with the cover 30, but a cover portion 28b is integrally connected to the case member 28 to cover a connection between the rod 48 and the driven shaft 24.

The cover portion 28b is fastened to the intake manifold 11 through a mounting plate 29 made of a synthetic resin and interposed between the cover portion 28b and the intake manifold 11. The cover portion 28b is fastened to the intake manifold 11, for example, by five bolts 33A to 33E. Among the bolts 33A to 33E, a pair of the bolts 33A and 33E are disposed at locations where the rod 48 is interposed between the driven shaft 24 and a diaphragm 35 of the actuator 26 (see the first embodiment).

The operated position of the switching valve 60 is detected by a detector 64 disposed to be adjacent the actuator 26 connected to one end of the driven shaft 24 outside the driven shaft 24 in a direction along the axis of the driven shaft 24. The detector 64 is mounted to the cover portion 28b to cover a portion of the driven shaft 24.

The detector 64 includes a detector housing 65 mounted to the cover portion 28b by a pair of screw members 68, 68 to cover one end of the driven shaft 24, a detected portion 66 such as a magnet mounted to the driven shaft 24 so that it is rotated in unison with the driven shaft 24, and a detecting portion 67 such as a Hall IC and an electromagnetic conversion element fixedly disposed within the detector housing 65 to detect the detected portion 66 in a non-contact manner. Thus, the detector can detect the rotated portion of the driven shaft 24, i.e., the operated position of the switching valve 60 without contacting with the driven shaft 24.

To mount the detected portion 66 to the driven shaft 24, the detected portion 66 may be fixed directly to the driven shaft 24, or a shaft having the detected portion 66 may be connected coaxially to the driven shaft 24, so that the driven shaft 24 and the detected portion 66 may be rotated in unison with each other.

According to the second embodiment, the switching valve 60 rotatably carried in the intake manifold 11 is of a butterfly type including the driven shaft 24 rotatably carried on the intake manifold 11 with the valve housing 62 interposed therebetween, and butterfly-type valve members 63 fixed to the driven shaft 24. Therefore, the deflection and distortion of the switching valve 60 over the axially entire length thereof can be suppressed to a small level, and the friction during the rotation can be reduced.

Moreover, the detector 64 of the non-contacting type for detecting the operated position of the switching valve 60 is mounted to the case 27 of the actuator 26 in correspondence to one end of the driven shaft 24 and hence, the friction on the detector 64 can be also suppressed to a small level. Therefore, it is possible to reduce the size of the actuator 26, while enabling a decrease in difference in rotated position of the switching valve 60 depending on the distance from the actuator 26. Moreover, an unbalanced load does not act on the detector 64 and hence, the detection accuracy can be enhanced, while enhancing the durability of the detector 64.

The detector 64 includes the detector housing 65 mounted to the cover portion 28b fixed to the intake manifold 11 to cover a portion of the driven shaft 24, the detected portion 66 mounted to the driven shaft 24 so that it is rotated in unison with the driven shaft 24, and the detecting portion 67 fixedly disposed within the detector housing 65 to detect the detected portion 66 in the non-contact manner. Therefore, the detected portion 66 of the detector 64 can be disposed on the driven shaft 24, whereby the construction of the detector 64 can be simplified, while the detector housing 65 of the detector 64 can be mounted easily to the case 27 of the actuator 11 in such a manner that the non-contacting with the driven shaft 24 is maintained. Thus, it is possible to facilitate the operation for assembling the detector 64.

In addition, because the actuator 26 connected to one end of the driven shaft 24 and the detector 26 are disposed adjacent each other, the operated position of the switching valve 60 can be detected by the detector 64 in a position with a smallest difference in rotated position of the switching valve 60 in the direction along the axis of the switching valve 60, leading to a further enhanced detection accuracy. Further, because the detector 64 is disposed outside the actuator 26 in the direction along the axis of the driven shaft 24, the structure of the detector 64 can be more simplified in such a manner that one end of the driven shaft 24 is covered with the detector housing 65. Moreover, the length from the connection of the actuator 26 to the driven shaft 24 to the detector 64 as well as the length from such connection to the other end of the driven shaft 24 can be set at a small value in such a manner that the actuator 26 is disposed between the intake manifold 11 and the detector 64, so that it is possible to provide a further enhancement in detection accuracy and to suppress the deflection and distortion of the switching valve 60 over the axially entire length thereof to a smaller level.

In addition, among the plurality of, e.g., five bolts 33A to 33E for fastening the cover portion 28b to the intake manifold 11, the pair of bolts 33A and 33E are disposed at the locations where the rod 48 is interposed between the driven shaft 24 and the diaphragm 35. Therefore, even if the actuator 26 having a relatively large weight is disposed to protrude from the cover portion 28b mounted to the intake manifold 11, it is possible to inhibit to the utmost that the vibration due to the oscillation of the actuator 26 acts on the cover portion 28b, and it is possible to prevent the vibration due to the oscillation of the actuator 26 from exerting an adverse effect to the detection accuracy of the detector 64.

Further, the cover portion 28b is fastened to the intake manifold 11 through the mounting plate 29 interposed between the cover portion 28b and the intake manifold 11, and the detector housing 65 of the detector 64 is mounted to the cover portion 28b. Therefore, the assembling operation can be facilitated in such manner that the actuator case 26 having the cover portion 28b, the detector 64 and the mounting plate are previously assembled together as a unit, and the unit is mounted to the intake manifold 11. In this case, if the valve housing 62 of the switching valve 60 is previously assembled to the unit, the assembling operation can be further facilitated.

In the second embodiment, the separate detector housing 65 is mounted to the cover portion 28b, but the cover portion 28b and the detector housing 65 may be formed integrally with each other.

Although the embodiments of the present invention have been described in detail, it will be understood that the present invention is not limited to the above-described embodiments, and various modifications in design may be made without departing from the spirit and scope of the invention defined in the claims.

For example, in the embodiments, the intake manifold has been described as being constructed so that the length of the intake passageway is switched over by the switching valve 20, 60, but the present invention is also applicable to an intake manifold constructed so that the volume of the intake air chamber 12 is switched over by the switching valve.

What is claimed is:

1. A pressure-responsive actuator comprising a case and a diaphragm in which the inside of the case is divided into first and second air chambers by the diaphragm having a peripheral edge clamped to said case wherein a coil spring is accommodated in said second air chamber for exerting a spring force for urging said diaphragm in a direction to decrease the volume of said first air chamber; and a rod is coaxially connected at one of opposite ends to a side of a retainer mounted to a central portion of said diaphragm on the side of said first air chamber and at the other end to a tip end of an arm fixed at its base end to a driven shaft rotatable about an axis perpendicular to a plane parallel to said rod, and wherein said case is provided with a tilt-restricting portion for restricting the tilt of said rod in the plane to a range in which the contacting of said diaphragm with the inner surface of said case can be avoided.

2. A pressure-responsive actuator according to claim 1, wherein at least one of said case, said retainer and said rod is made of a synthetic resin.

3. A pressure-responsive actuator according to claim 1 or 2, wherein said case and said rod are made of the same synthetic resin.

4. A pressure-responsive actuator according to claim 1 or 2, wherein said rod is integrally connected at one end to said retainer.

5. A pressure-responsive actuator according to claim 1, wherein said case is mounted to an intake manifold which is constructed so that the length of an intake passageway can be varied in response to the turning of a switching valve which is turnable along with said driven shaft.

6. A pressure-responsive actuator according to claim 5, wherein said intake manifold is made of a synthetic resin.

7. A pressure-responsive actuator according to claim 5 or 6, wherein said switching valve is made of a synthetic resin.

8. A pressure-responsive actuator according to claim 5, wherein said switching valve is constructed into a rotary type.

9. A pressure-responsive actuator according to claim 1, wherein for rotatable connection between said arm and said rod made of a synthetic resin, said arm has a pillow ball provided thereon; said rod is provided at the other end thereof with a fitting bore having at its intermediate portion an annular recess for supporting said pillow ball, and said rod has a plurality of notches provided therein to be open at least in a side of said fitting bore to which said pillow ball is fitted, said notches leading to said fitting bore at a plurality of circumferential points in said fitting bore.

10. A pressure-responsive actuator according to claim 9, wherein first, second and third ones of said plurality of notches are provided in the other end of the rod to extend radially from said fitting bore, said first notch extending in a longitudinal direction of said rod, said second and third notches being disposed at locations where they are spaced at the same distance apart from said first notch, and said second and third notches being defined to have a length shorter than that of said first notch.

11. A pressure-responsive actuator according to claim 5, wherein a cover portion is integrally provided on a portion of said case and fastened to said intake manifold to cover a connection between said rod and said driven shaft, and among a plurality of bolts for fastening said cover portion to said intake manifold, a pair of bolts are disposed at locations where said rod is interposed between said driven shaft and said diaphragm.

12. A pressure-responsive actuator according to claim 11, wherein said cover portion is fastened to said intake manifold through a mounting plate interposed between said cover portion and said intake manifold, and a detector housing of a detector for detecting the rotated position of said driven shaft is mounted to said cover portion.

* * * * *